(12) United States Patent
Cortopassi et al.

(10) Patent No.: US 7,976,337 B1
(45) Date of Patent: Jul. 12, 2011

(54) PALMTOP COMPUTER DOCKING SYSTEM WITH USB CABLE ASSEMBLY

(75) Inventors: Michael Cortopassi, Arlington Heights, IL (US); Eric Fuhs, Crystal Lake, IL (US); John Byrne, Lake Villa, IL (US)

(73) Assignee: Palm, Inc., Sunnyvale, CA (US)

( * ) Notice: Subject to any disclaimer, the term of this patent is extended or adjusted under 35 U.S.C. 154(b) by 105 days.

(21) Appl. No.: 10/222,123

(22) Filed: Aug. 16, 2002

Related U.S. Application Data (62) Division of application No. 09/801,991, filed on Mar. 7, 2001, now abandoned.

(51) Int. Cl.
*H01R 11/00* (2006.01)

(52) U.S. Cl. ........ 439/502; 439/533; 439/929; 439/638; 439/505

(58) Field of Classification Search ................. 439/638, 439/929, 505, 533, 218, 502; 361/686, 683, 361/680, 687, 679.41, 674.56, 679.3
See application file for complete search history.

(56) References Cited

U.S. PATENT DOCUMENTS

| | | | | |
|---|---|---|---|---|
| 5,573,425 A | * | 11/1996 | Morisawa et al. | 439/502 |
| 5,982,614 A | * | 11/1999 | Reid | 361/686 |
| D420,989 S | * | 2/2000 | Sandhu et al. | D14/447 |
| 6,152,778 A | * | 11/2000 | Dalton | 439/638 |
| 6,154,010 A | * | 11/2000 | Geiger | 320/137 |
| 6,208,734 B1 | | 3/2001 | Ortscheid et al. | |
| 6,240,426 B1 | * | 5/2001 | Beyda et al. | 707/201 |
| 6,283,777 B1 | * | 9/2001 | Canova et al. | 439/218 |
| 6,283,789 B1 | * | 9/2001 | Tsai | 439/502 |
| 6,364,697 B1 | * | 4/2002 | Tseng et al. | 439/533 |
| D458,266 S | * | 6/2002 | Herath | D14/434 |
| 6,483,698 B1 | * | 11/2002 | Loh | 361/679.41 |
| 6,608,264 B1 | * | 8/2003 | Fouladpour | 200/51.03 |
| 6,909,907 B1 | * | 6/2005 | Oyang et al. | 439/502 |

FOREIGN PATENT DOCUMENTS

| | | |
|---|---|---|
| DE | 9409902 | 9/1994 |
| DE | 29917189 | 1/2000 |

* cited by examiner

*Primary Examiner* — Briggitte R Hammond (57) ABSTRACT

A method and system for coupling to a palmtop computer that supports both mobile computing and desktop use. A palmtop computer docking system is disclosed that includes a cable assembly and a base. The cable assembly includes a palmtop computer connection mechanism that is connected to a USB connector and that is connected to a power connection mechanism via an electrical cable. Power is provided via the power connection mechanism. The cable assembly is adapted to engage the base so as to produce a fully functional docking cradle. In operation, once the cable assembly is engaged with the base, the USB connector is then coupled to the desired computing device (typically either a portable computer or a full-size computer). The resulting docking cradle facilitates desktop use such as, for example, communication with a full size computer. The cable assembly can be removed from the base and can be used independently of the base for mobile computing.

20 Claims, 12 Drawing Sheets

PALMTOP COMPUTER DOCKING SYSTEM WITH USB CABLE ASSEMBLY

This is a divisional of application Ser. No. 09/801,991 filed on Mar. 7, 2001 now abandoned which designated in the U.S.

BACKGROUND OF THE INVENTION

1. Field of the Invention

The present invention relates to the field of computer systems. More specifically, the present invention relates to a method and apparatus for coupling information between a palmtop computer and another computing device.

2. Related Art

As the components required to build a computer system have reduced in size, new categories of computer systems have emerged. One of the new categories of computer systems is the "palmtop" computer system. A palmtop computer system is a computer that is small enough to be held in the hand of a user and can be "palm-sized." Most palmtop computer systems are used to implement various Personal Information Management (PIM) applications such as an address book, a daily organizer and electronic notepads, to name a few.

A docking cradle is typically used for connecting a palmtop computer to another computing device such as a desktop computer. Docking cradles typically include a slot or a surface that receives the palmtop computer such that a connector receptacle on the palmtop computer engages a corresponding connector of the docking cradle. The connector receptacle of the docking cradle is typically permanently attached to the housing of the docking cradle and is connected to an electrical cable that extends through an opening in the rear of the housing. The free end of the electrical cable connects to a serial connector.

Typically, docking cradles are used in desktop environments by connecting the serial connector to a full-size computer. The docking cradle is then placed on the desk where it remains until such time that communication is needed between the palmtop computer and the full-size computer. At that time, the palmtop computer is inserted into the docking cradle. The full-size computer is then operated so as to initiate the required communication. Typically, communication between the palmtop computer and the full-size computer takes the form of "synchronization." That is, specific files on both the full-size computer and the palmtop computer are updated such that both the files on the full-size computer and the palmtop computer include the same data.

Some recent docking cradles include a button that is permanently installed within the housing of the docking cradle. The button electrically connects to the electrical cable and/or to the connector. When a palmtop computer is inserted into a docking cradle that is attached to a full-size computer, the button can be pressed so as to synchronize the palmtop computer to the full-size computer. This makes synchronization easy because the user does not have to operate a software program on the desktop computer to achieve synchronization.

Many owners of palmtop computers also own portable computers such as, for example, portable desktop computers and laptop computers that are used for mobile computing applications. Docking cradles are typically bulky and heavy, making them unsuitable for mobile computing applications. Therefore, many owners of portable computers purchase both a cradle (for desktop use) and a cable assembly designed specifically for mobile computing (for use while traveling). The purchase of both a docking cradle and a cable assembly that is designed specifically for mobile computing is expensive and is inefficient.

Recently, Universal Serial Bus (USB) connection mechanisms have become popular for coupling devices to USB ports on both portable computers and full-size computers. Though power is provided through USB connection mechanisms, the amount of power supplied is not sufficient for quickly charging a palmtop computer.

In addition, some users require connection using a standard serial port while other users require connectivity to a USB port. Therefore, to provide the needed connectivity, manufacturers typically make two docking cradles, one with a USB connection mechanism and one with a standard serial connector.

Thus, what is needed is a method and apparatus for coupling to a palmtop computer that supports both mobile computing and desktop use. Also, a method and apparatus is needed that meets the above need and that allows for connection using a USB port. Moreover, a method and apparatus is needed that meets the above needs and that that provides sufficient power to quickly charge the palmtop computer. Furthermore, a method and apparatus is needed that meets the above needs and that is inexpensive, compact, and light weight enough for mobile computing applications.

SUMMARY OF THE INVENTION

The present invention provides a method and apparatus for coupling to a palmtop computer system that supports both mobile computing and desktop computing uses. Also, the apparatus and method of the present allows for connection using a USB port. In addition, the apparatus and method of the present invention is inexpensive and is compact and lightweight enough for mobile computing applications. The present invention provides these advantages and others not specifically mentioned above but described in the sections to follow.

A method and apparatus is described for coupling to a palmtop computer system. In the present embodiment, a palmtop computer docking system is disclosed that includes a cable assembly and a base. The cable assembly includes a connection mechanism for coupling to a computing device and a palmtop computer connection mechanism that mates with a corresponding connector receptacle on a palmtop computer. The cable assembly is adapted to engage the base so as to produce a fully functional docking cradle.

In one embodiment, the base includes a button that is disposed on the front surface of the base. Once the base is engaged with a palmtop computer system, the button can be pressed to initiate synchronization between the palmtop computer system and a connected computing device.

In the present embodiment, each cable assembly includes a power cable that provides for coupling power from a power source. This allows for quickly and easily recharging the palmtop computer.

The palmtop computer docking system of the present invention is suitable for both a desktop and mobile computing (e.g. use with a laptop computer). Mobile computing is easily achieved using the cable assembly alone while communication with a non-mobile computer is achieved using both the base and the cable assembly.

In one embodiment, users are supplied with the base and with two cable assemblies, one cable assembly that includes a USB connection mechanism and one cable assembly that includes a serial connection mechanism. This allows for the user to form a fully functional cradle assembly using either the cable assembly that includes the USB connection mechanism or using the cable assembly that includes the serial connection mechanism. This provides significant cost savings over the prior art method of selling two different cradles, each designed for use with a different interface.

These and other objects and advantages of the present invention will become obvious to those of ordinary skill in the art after having read the following detailed description of the preferred embodiments that are illustrated in the various drawing figures.

DETAILED DESCRIPTION OF THE INVENTION

In the following detailed description of the present invention, a method and apparatus for connecting to a palmtop computer system, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

Notation and Nomenclature

Some portions of the detailed descriptions that follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "determining" or "calculating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Coupling to a Palmtop Computer System in Accordance with the Present Invention

Figure 1:
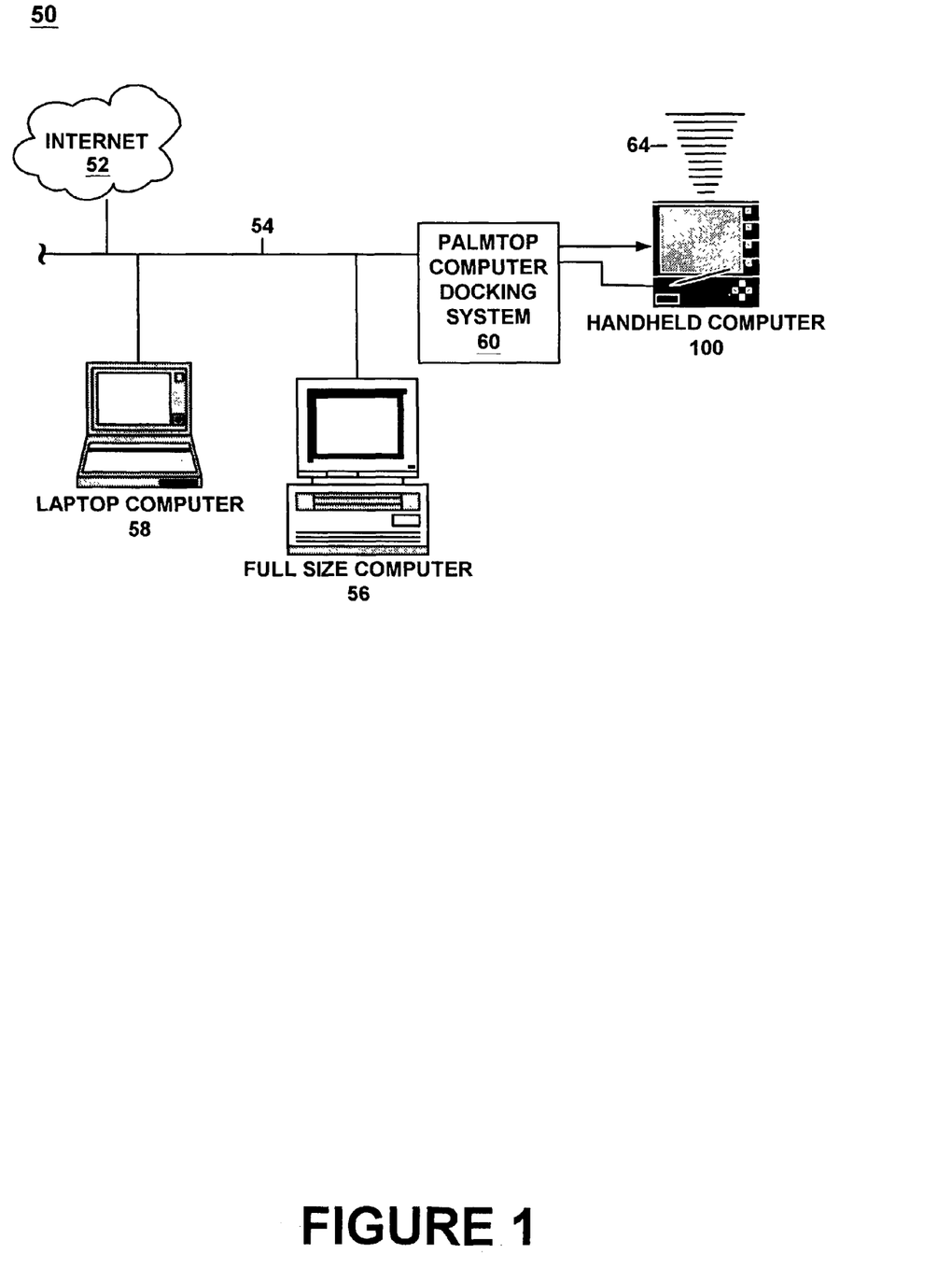
FIG. 1 is system illustration of a palmtop computer system connected to other computer systems and the Internet via a palmtop computer docking system in accordance with the present invention.

FIG. 1 illustrates a system 50 that includes a palmtop computer docking system 60. System 50 includes a computer system 56 that can either be a desktop unit as shown, or, alternatively, can be a portable computer system such as laptop computer system 58. Computer system 58 and computer system 56 are shown connected to a communication bus 54, which in one embodiment can be a serial communication bus, but could be of any of a number of well known designs, e.g., a parallel bus, Ethernet Local Area Network (LAN), etc. Optionally, bus 54 can provide communication with the Internet 52 using a number of well-known protocols.

Bus 54 is also coupled to palmtop computer docking system 60 for receiving and initiating communication with a palmtop ("palm-sized") portable computer system 100 of the present invention. Palmtop computer docking system 60 provides an electrical and mechanical communication interface between bus 54 (and anything coupled to bus 54) and computer system 100 for two-way communications. Computer system 100 also contains a wireless infrared communication mechanism 64 for sending and receiving information from other devices.

Figure 2:
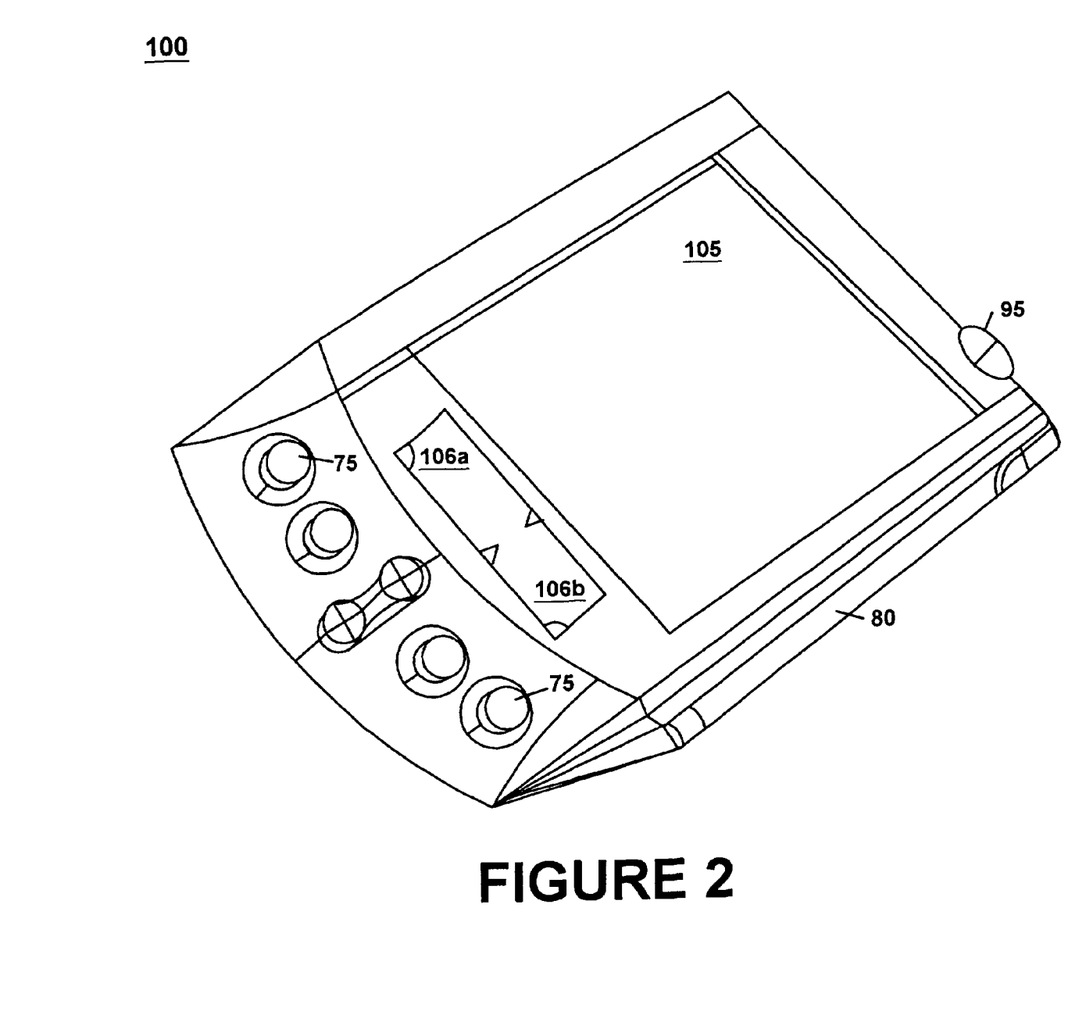
FIG. 2 is a front perspective view of a palmtop computer system that can be coupled to other computing systems using the palmtop computer docking system of the present invention.

FIG. 2 is a perspective illustration of an exemplary palmtop computer system 100. Palmtop computer system 100 contains a display screen 105 surrounded by a bezel or cover. A removable stylus 80 is also shown. The display screen 105 is a touch screen able to register contact between the screen and the tip of the stylus 80. The stylus 80 can be of any material to make contact with the screen 105. Palmtop computing system 100 also contains one or more dedicated and/or programmable buttons 75 for selecting information and causing the computer system to implement functions. The on/off button 95 is also shown.

FIG. 2 also illustrates a handwriting recognition pad or "digitizer" containing two regions 106a and 106b. Region 106a is for the drawing of alpha characters therein for automatic recognition and region 106b is for the drawing of numeric characters therein for automatic recognition. The stylus 80 is used for stroking a character within one of the regions 106a and 106b. The stroke information is then fed to an internal processor for automatic character recognition. Once characters are recognized, they are typically displayed on the screen 105 for verification and/or modification.

Figure 3:
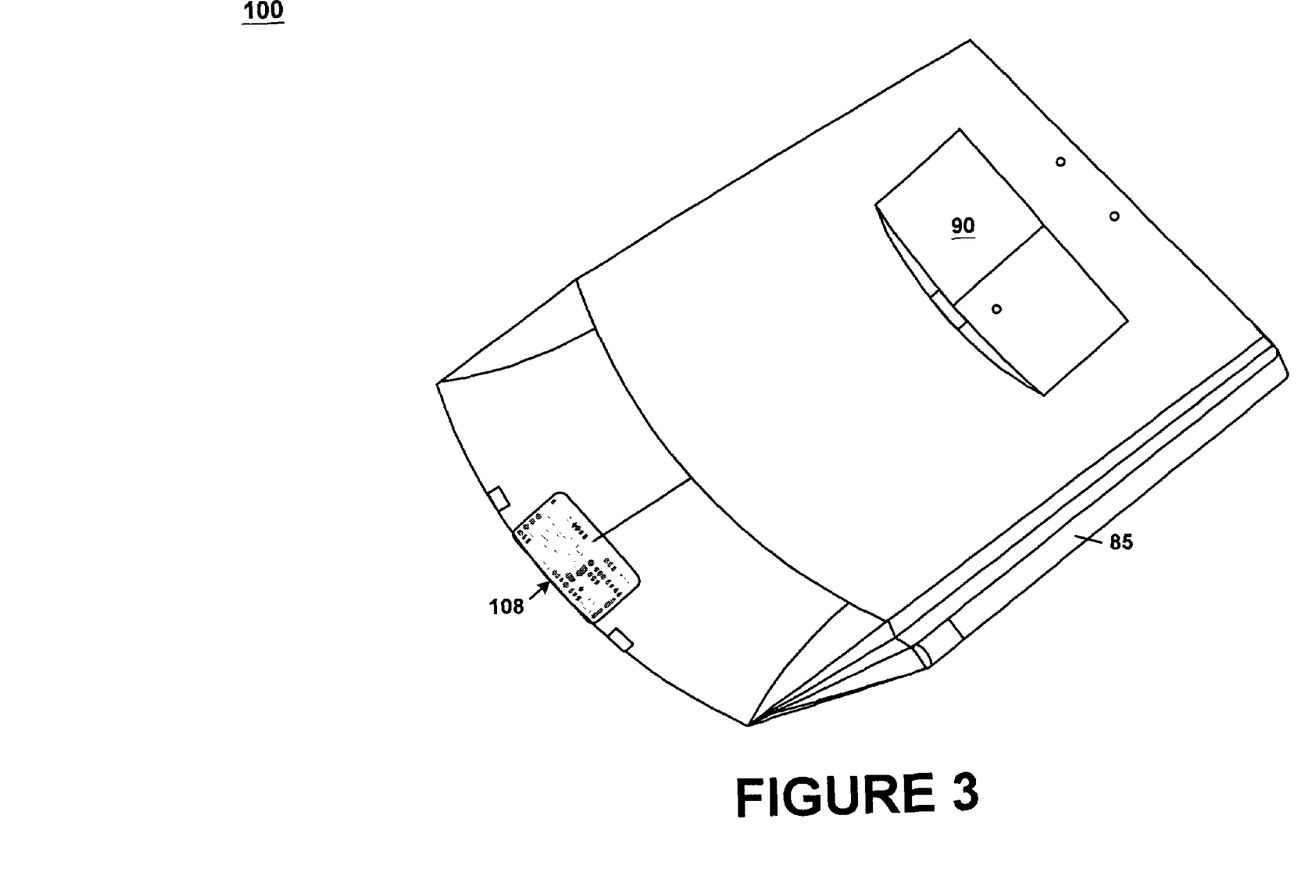
FIG. 3 is a rear perspective view of the palmtop computer system of FIG. 2.

FIG. 3 illustrates the bottom side of palmtop computer system 100. An optional extendible antenna 85 is shown and also a battery storage compartment door 90 is shown. A communication interface 108 is also shown. In one embodiment of the present invention, the communication interface 108 is a wipe-style serial connector. Alternatively, communication interface 108 could be of any of a number of well known types of communication devices and could use any of a number of standards and protocols such as, for example, parallel, SCSI, Firewire (IEEE 1394), Ethernet, etc.

Figure 4:
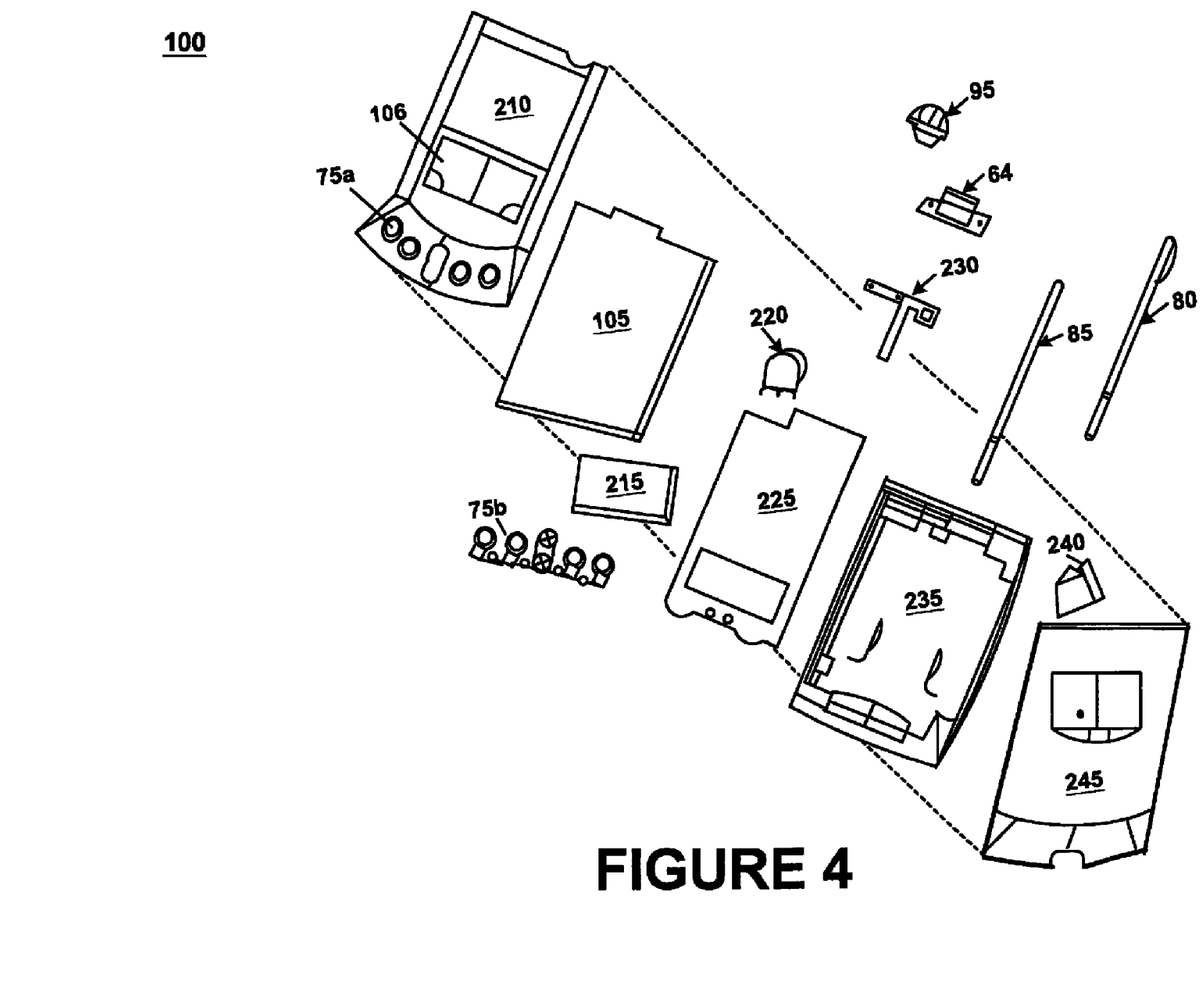
FIG. 4 is an exploded view of the components of the palmtop computer system of FIG. 2.

FIG. 4 is an exploded view of palmtop computer system 100 in accordance with one implementation. System 100 contains a front cover 210 having an outline of region 106 and holes 75a for receiving buttons 75b. A flat panel display 105 (both liquid crystal display and touch screen) fits into front cover 210. Any of a number of display technologies can be used, e.g., LCD, FED, plasma, etc., for the flat panel display 105. A battery 215 provides electrical power and can be rechargeable. A contrast adjustment (potentiometer) 220 is also shown. On/off button 95 is shown along with an infrared emitter and detector device 64. A flex circuit 230 is shown along with a PC board 225 containing electronics and logic (e.g., memory, communication bus, processor, etc.) for implementing computer system functionality. The digitizer pad is also included in PC board 225. A midframe 235 is shown along with stylus 80. Position adjustable antenna 85 is shown.

A radio receiver/transmitter device 240 is also shown between the midframe and the rear cover 245 of FIG. 4. The receiver/transmitter device 240 is coupled to the antenna 85 and also coupled to communicate with the PC board 225.

Figure 5:
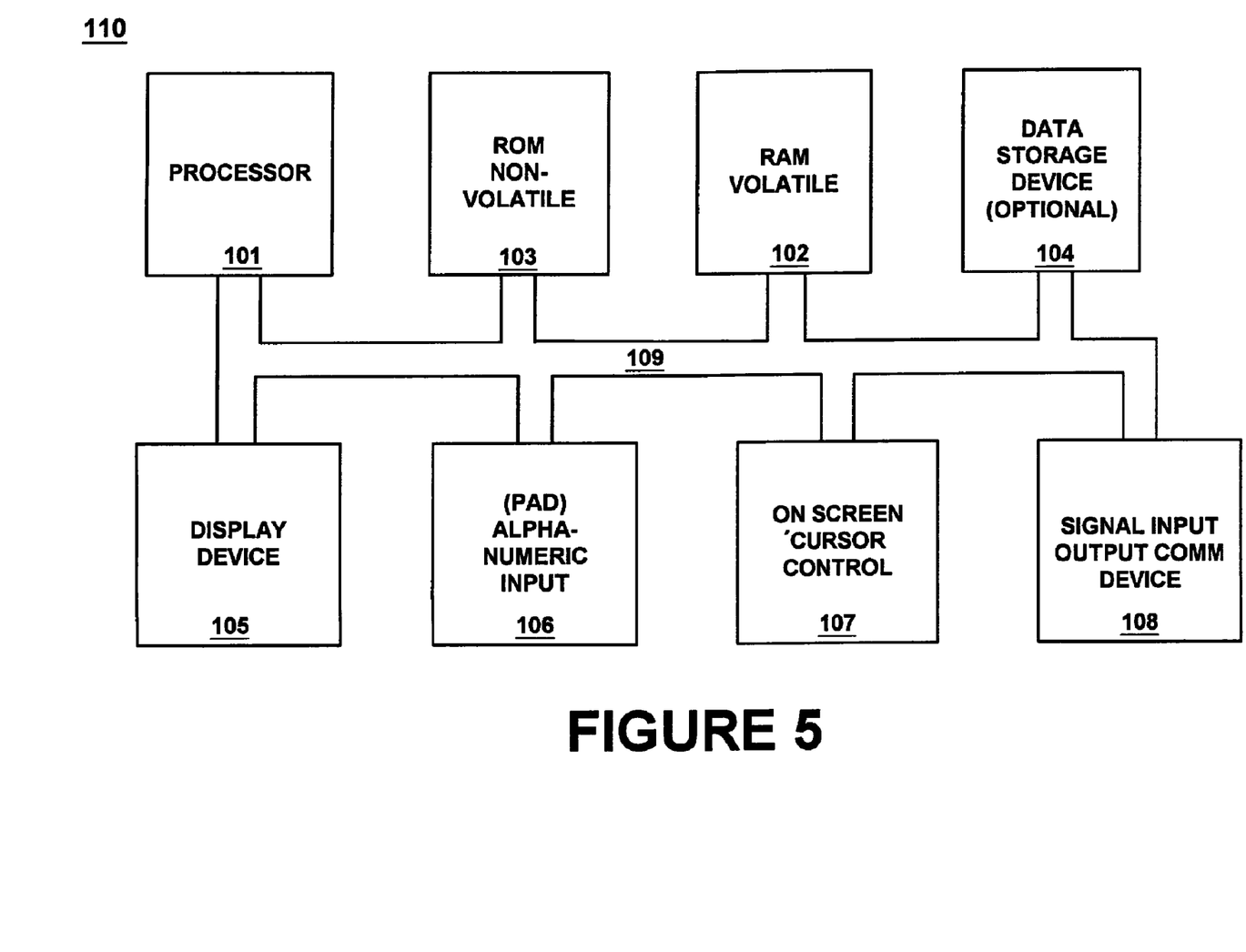
FIG. 5 is a perspective view of an exemplary computer system.

FIG. 5 illustrates circuitry of computer system 110, some of which can be implemented on PC board 225. Computer system 110 includes an address/data bus 109 for communicating information, a central processor 101 coupled with the bus for processing information and instructions, a volatile memory 102 (e.g., random access memory RAM) coupled with the bus 109 for storing information and instructions for the central processor 101 and a non-volatile memory 103 (e.g., read only memory ROM) coupled with the bus 109 for storing static information and instructions for the processor 101. Computer system 110 also includes an optional data storage device 104 (e.g., memory stick) coupled with the bus 109 for storing information and instructions. Device 104 can be removable. As described above, system 110 also contains a display device 105 coupled to the bus 109 for displaying information to the computer user. PC board 225 can contain the processor 101, the bus 109, the ROM 103 and the RAM 102.

Also included in computer system 110 of FIG. 5 is an optional alphanumeric input device 106 that in one implementation is a handwriting recognition pad ("digitizer") having regions 106a and 106b (FIG. 2A), for instance. Device 106 can communicate information and command selections to the central processor 101. System 110 also includes an optional cursor control or directing device 107 coupled to the bus for communicating user input information and command selections to the central processor 101. In one implementation, device 107 is a touch screen device incorporated with screen 105. Device 107 is capable of registering a position on the screen 105 where the stylus makes contact. The display device 105 utilized with the computer system 100 may be a liquid crystal device, cathode ray tube (CRT), field emission device (FED, also called flat panel CRT) or other display device suitable for creating graphic images and alphanumeric characters recognizable to the user. In the preferred embodiment, display 105 is a flat panel display.

Signal input output communication device 108, also coupled to bus 109, can be a communication device for communicating with palmtop computer docking system 60 of the present invention. In one embodiment, communication device 108 is a serial port adapted to couple communications to palmtop computer docking system 60 of the present invention.

Figure 6:
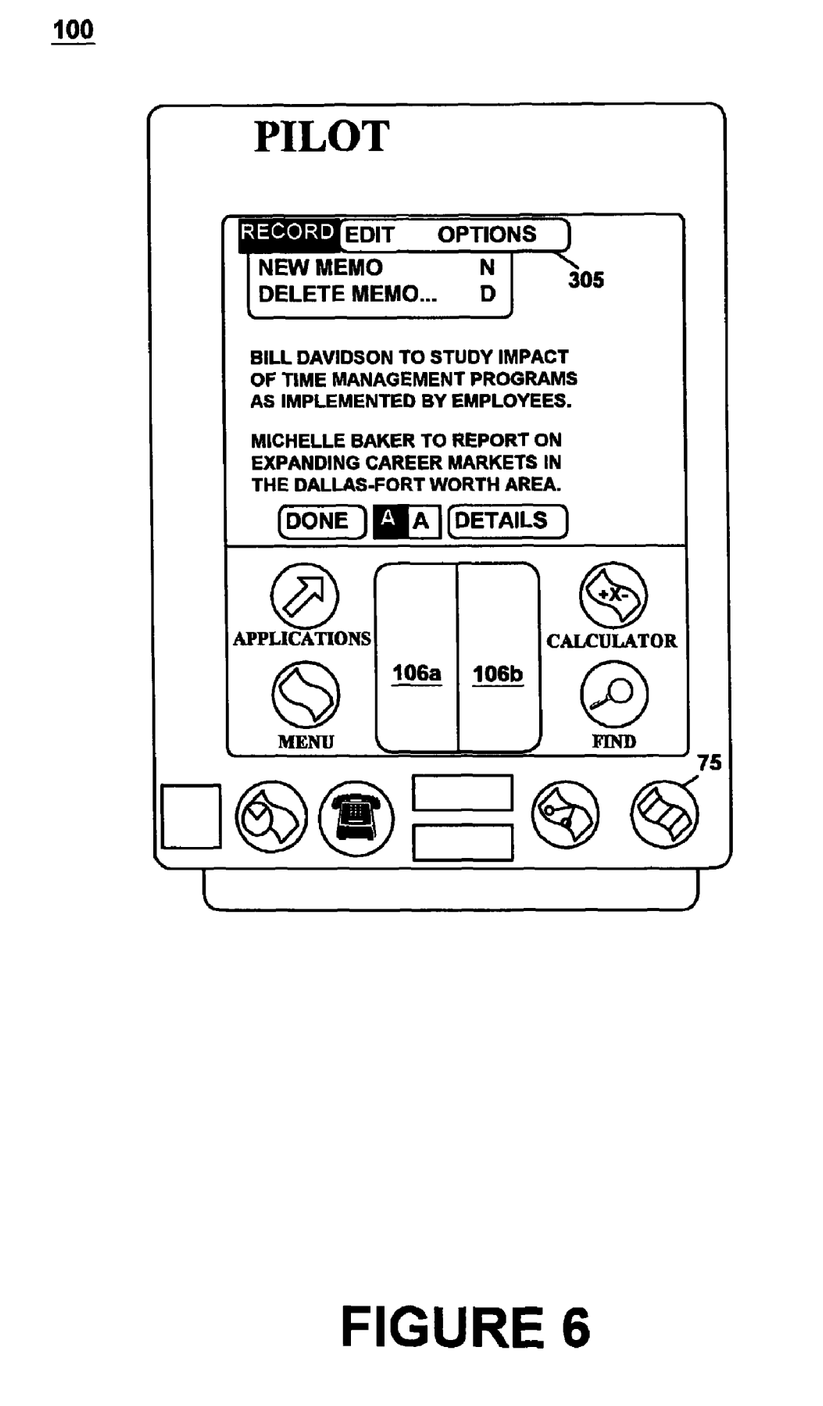
FIG. 6 is a logical block diagram showing a display of a palmtop computer system.

FIG. 6 is a front view of palmtop computer system 100 with a menu bar 305 open displaying a pull down window. Also shown are two regions of digitizer 106a and 106b. Region 106a is for receiving user stroke data for alphabet characters, and typically not numeric characters, and region 106b is for receiving user stroke data for numeric data, and typically not for alphabetic characters. Physical buttons 75 are also shown.

FIGS. 7-13 show a palmtop computer docking system 60a that includes cable assembly 720a that is adapted to couple a computer system (e.g. palmtop computer system 100 of FIGS. 1-6 and computer system 110 of FIG. 5) to other computing systems and/or devices. Palmtop computer docking system 60a also includes base 700 that receives cable assembly 720a so as to produce a fully functional docking cradle. Base 700 includes housing 703 within which button 702 is disposed. In the present embodiment, housing 703 is a molded plastic. However, any of a number of other materials could be used to form housing 703. Palmtop computer connection mechanism 701 couples to base 700 and is adapted to couple to a corresponding connection mechanism (e.g., wipe-style serial connector 108 of FIG. 3) on palmtop computer 100.

Figure 8:
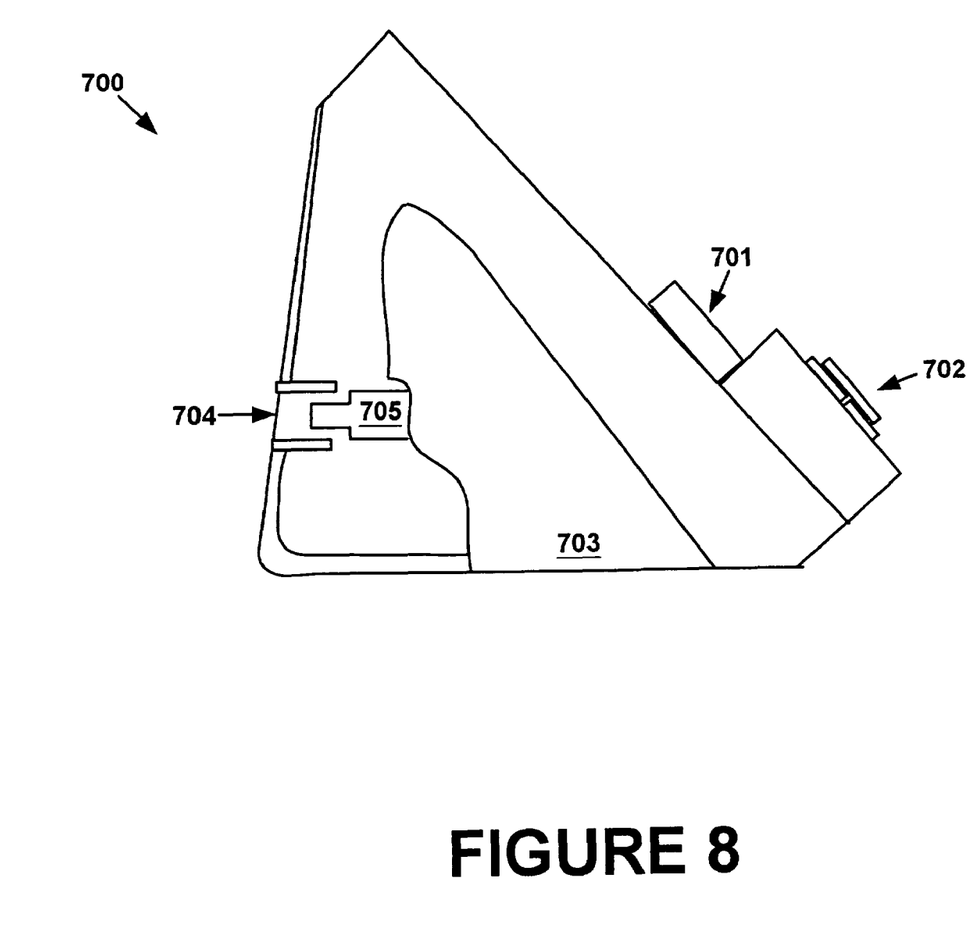
FIG. 8 illustrates a cut-away side view of the docking cradle of FIG. 7 once the cable assembly is removed therefrom in accordance with one embodiment of the present invention.
Figure 9:
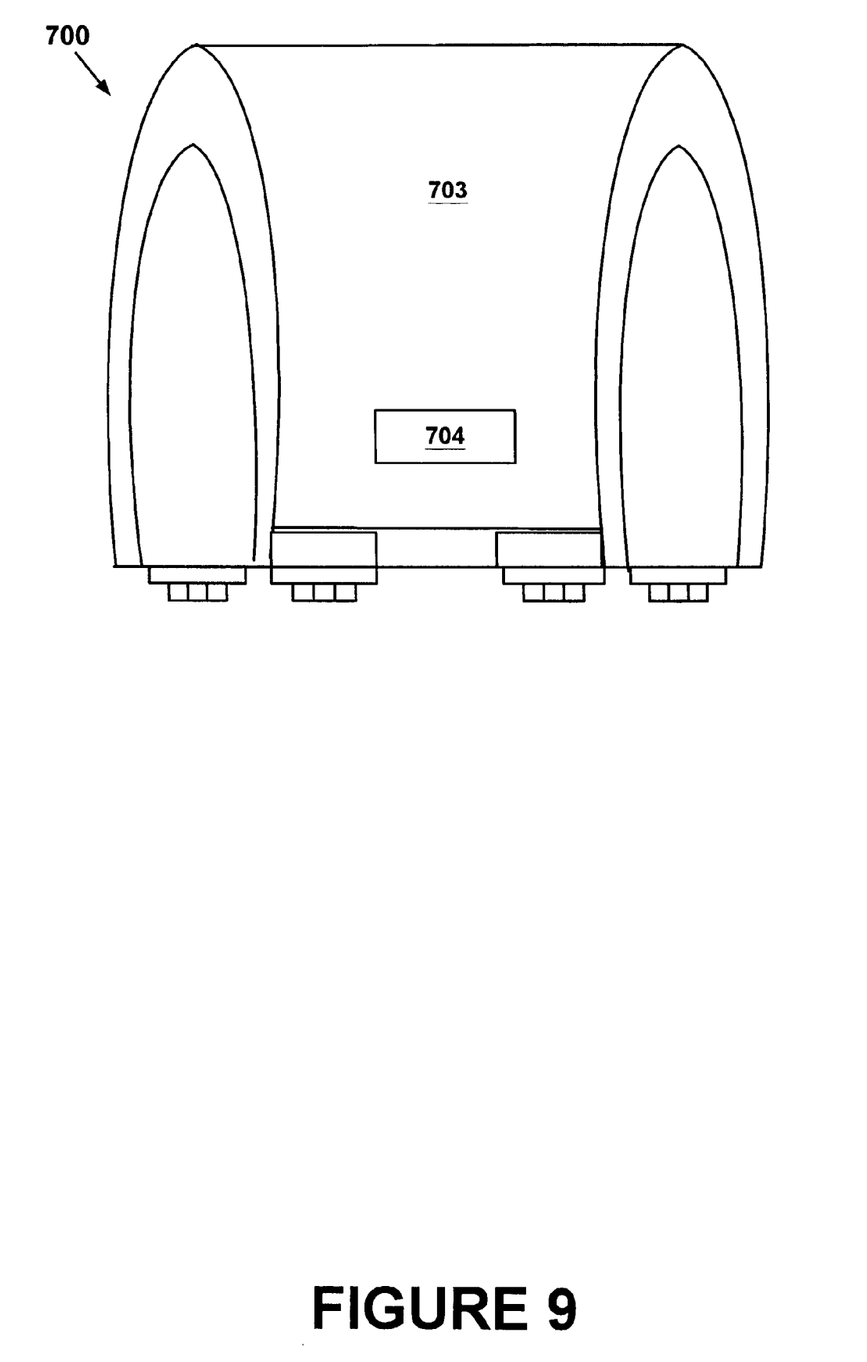
FIG. 9 illustrates a rear view of the docking cradle of FIG. 7 once the cable assembly is removed therefrom in accordance with one embodiment of the present invention.

FIGS. 8-9 show base 700 with cable assembly 720a removed therefrom. In the present embodiment, opening 704 extends through the back surface of housing 703. Connection mechanism 705 is disposed inside of housing 703 proximate to opening 704. Connection mechanism 705 is electrically coupled to connection mechanism 701 and to button 702. In the present embodiment, connection mechanism 705 is a wipe-style electrical connector that is adapted to receive a palmtop computer connection mechanism.

Figure 10:
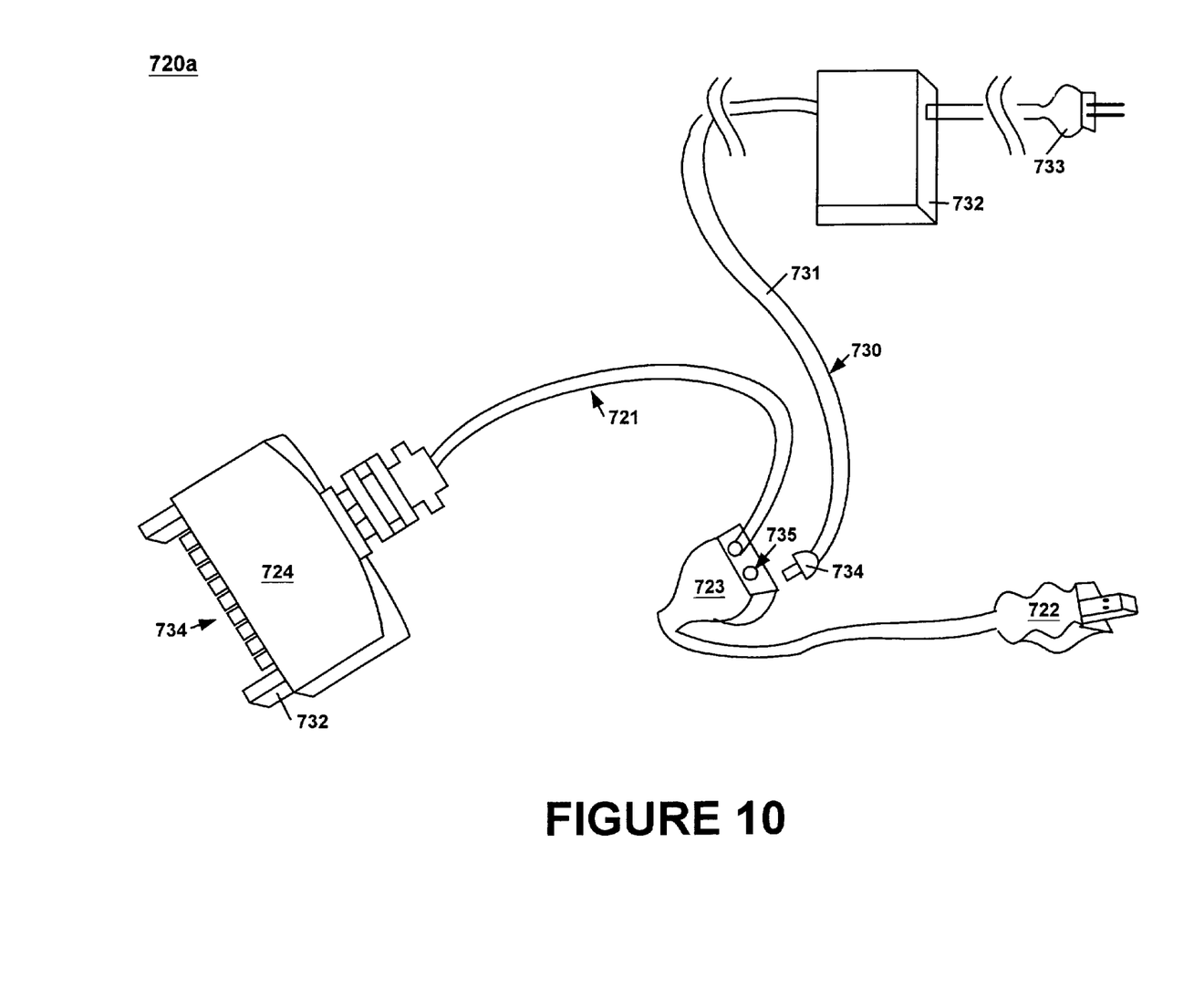
FIG. 10 is a front perspective view of a cable assembly that includes a USB connection mechanism in accordance with an embodiment of the present invention.

Referring now to FIG. 10, cable assembly 720a includes palmtop computer connection mechanism 724 that is electrically coupled to Universal Serial Bus (USB) connection mechanism 722 via electrical cable 721. In the present embodiment, connection mechanism 724 is a mechanical and electrical interface for interfacing with palmtop computer system 100 shown in FIGS. 1-6. In the present embodiment, palmtop computer connection mechanism 724 is a connector receptacle adapted to couple to the wipe-style connector pins of communications interface 108 shown in FIG. 3. In the present embodiment, USB connection mechanism 722 is a male USB connector adapted to electrically couple cable assembly 720a to other electrical devices such as, for example, laptop computer 58 and desktop computer 56 of FIG. 1.

Figure 7:
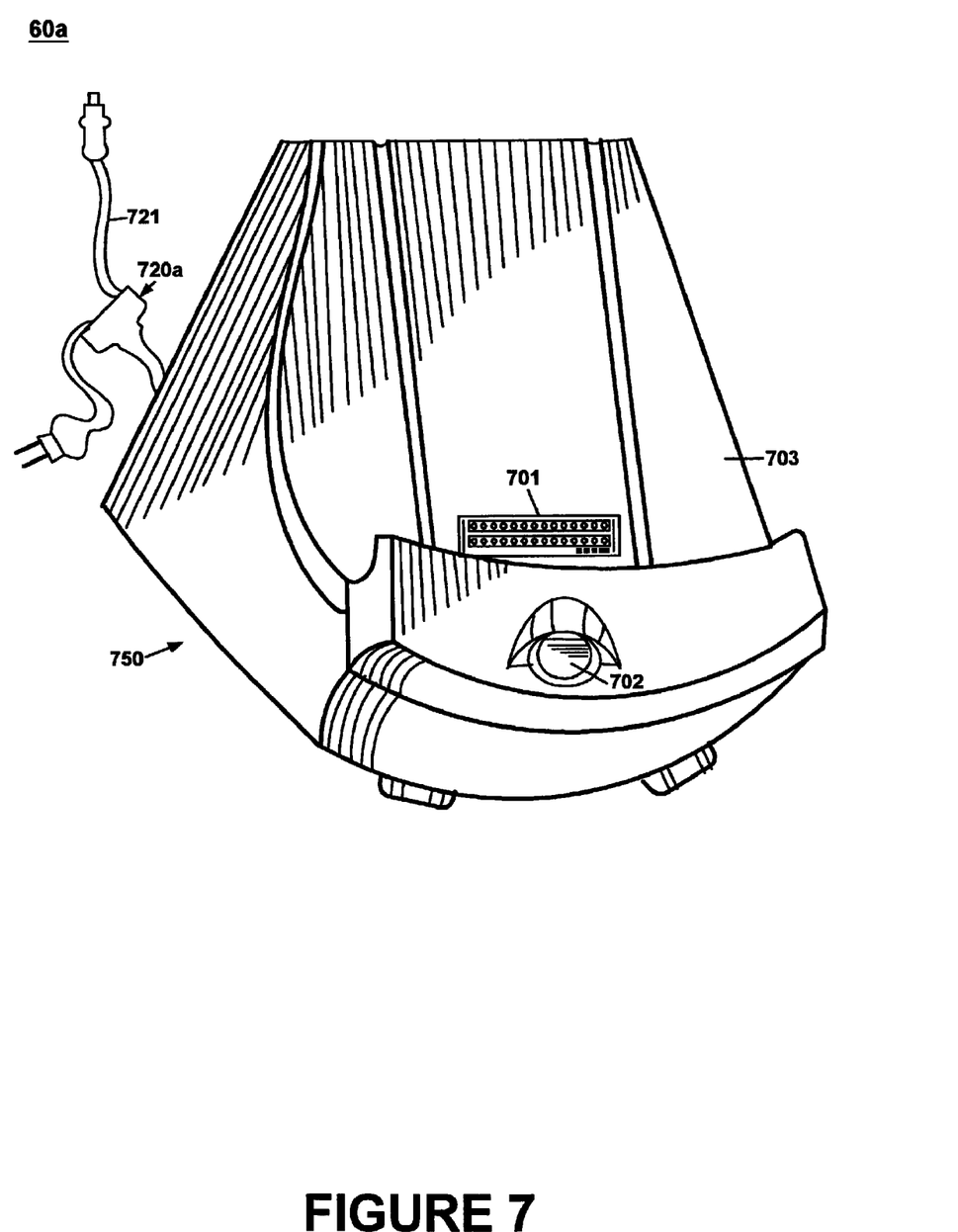
FIG. 7 is a front perspective view of a palmtop computer docking system that includes a cable assembly that is engaged with a base in accordance with an embodiment of the present invention.

In the present embodiment, palmtop computer connection mechanism 724 and palmtop computer connection mechanism 701 of FIGS. 7-8 are wipe-style serial connectors that include engaging projections 732 and electrical contacts 734 for mechanically and electrically engaging to a corresponding connector of a palmtop computer system and mechanically and electrically engaging connection mechanism 705.

Cable assembly 720a also includes power connection mechanism 723 which is adapted to receive power from a power source independent of USB connection mechanism 722. In the present embodiment, power connection mechanism 723 includes a barrel-style connector receptacle 735 that is disposed within a housing. Connector receptacle 735 is electrically coupled to connector 724 via cable 721. Thereby, power coupled to power connection mechanism 723 is provided to a palmtop computer, either directly (by coupling the palmtop computer to palmtop computer connection mechanism 734) or indirectly (by coupling the palmtop computer to base 700 of FIGS. 7-9 and coupling cable assembly 720a to base 700). Because cable assembly 720a receives power from a power source independent of USB connector 722, there is sufficient power to quickly charge a palmtop computer.

Still referring to FIG. 10, power cable assembly 732 is shown that provides power to connector 735. In the present embodiment, power cable assembly 730 includes male barrel-style connector 734, electrical cable 731, A/C adapter 732, and electrical plug 733. Electrical plug 733 couples to an electrical outlet for receiving electrical power which is converted from alternating current to direct current at NC adapter 732 and which is transmitted through electrical cable 731 to connector 734.

When cable assembly 720a is coupled to base 700 of FIGS. 7-9, a complete docking cradle is formed. The resulting docking cradle is well suited for desktop computing such as, for example, making a connection between the palmtop computing device 100 and a full size computer. In addition, cable assembly 720a can be used independently of base 700 for mobile computing applications.

Figure 11:
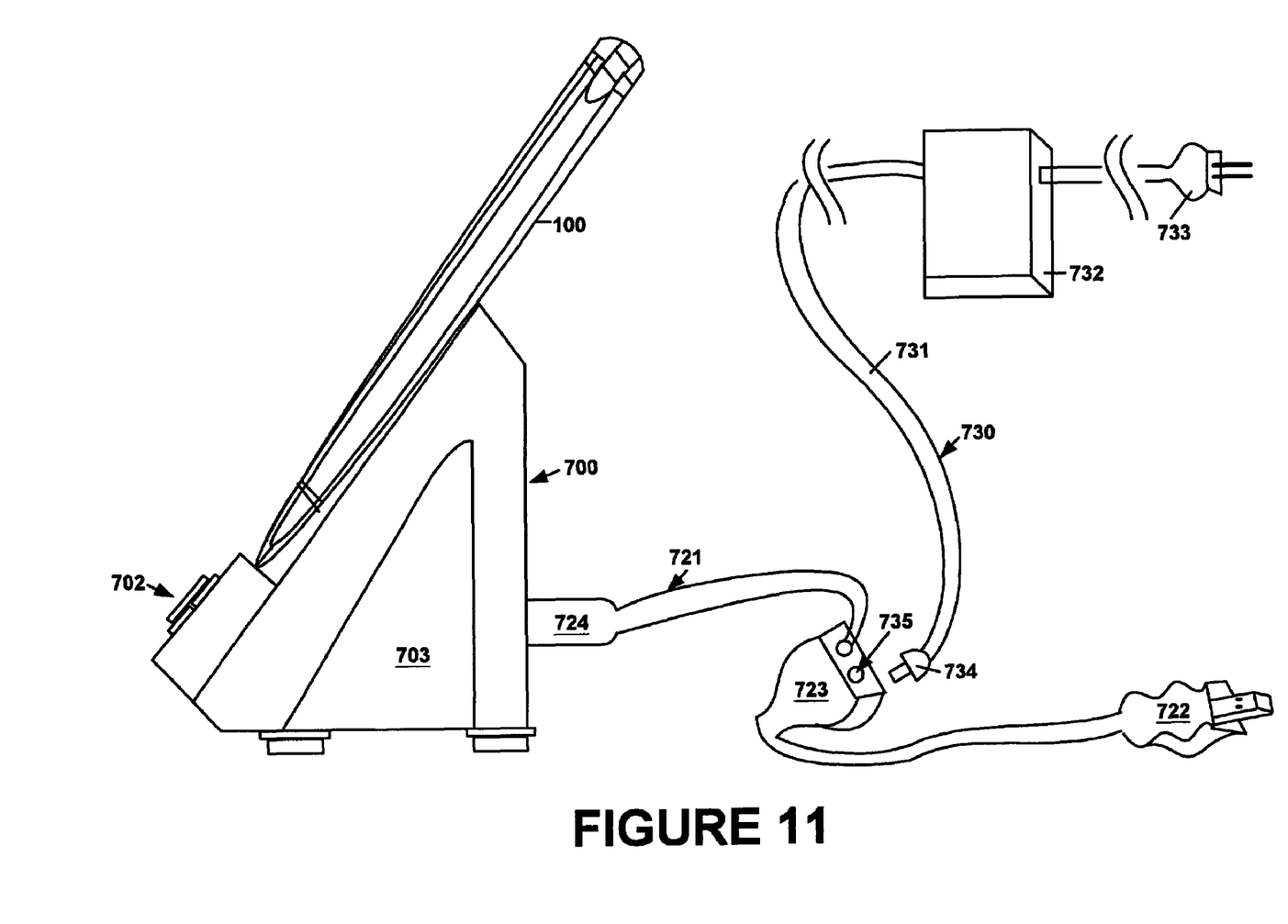
FIG. 11 illustrates a side view of a palmtop computer system that is inserted into a palmtop computer docking system in accordance with an embodiment of the present invention.

FIG. 11 shows a palmtop computer 100 disposed within the palmtop computer docking system 60a formed by coupling cable assembly 720a to base 700. When palmtop computer connection mechanism 724 is inserted into opening 704 of FIGS. 8-9, palmtop computer connection mechanism 724 electrically and mechanically connected to base 700. In the present embodiment, button 702 can be pressed to achieve synchronization with palmtop computer 100. Thereby, computing devices that are coupled to USB connection mechanism 722 are electrically coupled to palmtop computer system 100.

Figure 12:
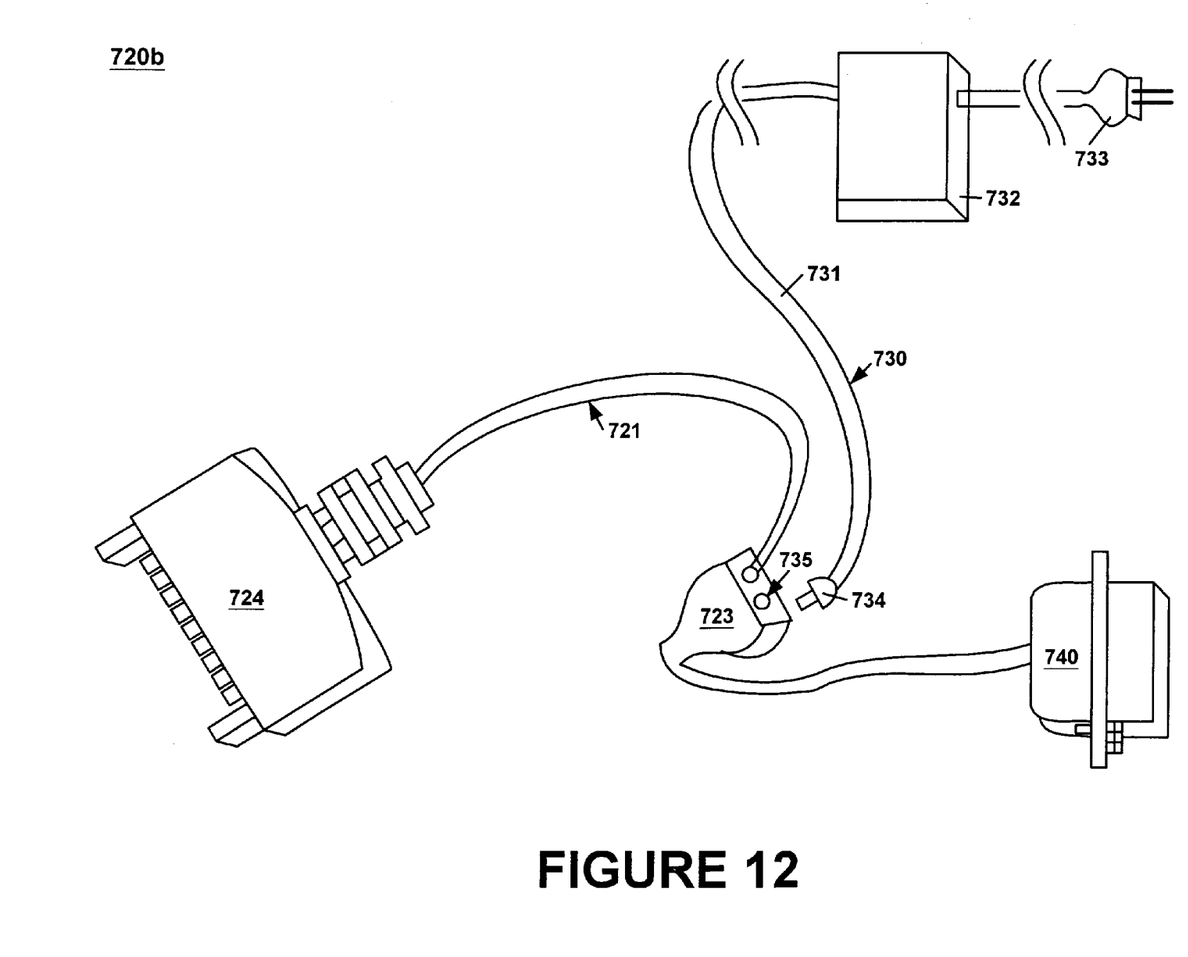
FIG. 12 is a front perspective view of a cable assembly that includes a standard serial connector in accordance with an embodiment of the present invention.

Referring now to FIG. 12, a cable assembly 720b is shown that includes a serial connector 740 that is adapted to couple to a serial port of a computing device. Cable assembly 720b can couple to base 700 for coupling a palmtop computer to a portable computer or a desktop computer that includes a serial port. Cable assembly 720b can also be used to directly couple a palmtop computer to a portable computer or a desktop computer. The present invention is also well adapted to the use of other types of connection mechanisms for coupling to a portable computer or a desktop computer.

Though Cable assembly 720a and cable assembly 720b are shown to include provision for coupling to a power source that includes an electrical cable 736, A/C adapter 732, connector 734 and electrical plug 733, the present invention is well adapted for use of other mechanisms for coupling to a power source. More particularly, in an alternate embodiment of the present invention (not shown), a cable is used that includes a connector adapted to couple to a direct current power source (e.g., a car cigarette lighter).

In one embodiment, customers are provided with base 700, cable assembly 720a, and cable assembly 720b. This allows for connection to either a USB port or a serial port.

Cable assembly 720a and cable assembly 720b can be used independently of base 700 for coupling to a computer that is a portable computer (e.g. laptop computer 58 of FIG. 1) for mobile computing applications. That is, either cable assembly 720a or cable assembly 720b is used independently of base 700 to couple to, for example, laptop computer 58. This is accomplished by connecting palmtop computer connection mechanism 724 directly to a palmtop computer system 100 and connecting the opposite end of cable assembly 720a or 720b to the portable computer. Cable assemblies 720a-720b enable mobile users to easily synchronize data between palmtop computer system 100 and laptop computer 58 by operating the laptop computer so as to initiate synchronization. Cable assemblies 720a-720b are smaller in size and lighter than a full-size conventional docking cradles, and therefore, are more easily carried. Thus, cable assemblies 720a-720b, used independently of base 700, facilitate mobile computing.

The palmtop computer docking system 60a of the present invention is suitable for both a desktop environment (e.g. use with full-size computer 56 of FIG. 1) and mobile computing (e.g. laptop computer 58 of FIG. 1). More particularly, connection to a portable computer is easily achieved using cable assembly 720a or cable assembly 720b while connection to a desktop computer is facilitated by the use of both base 700 and one of cable assemblies 720a-720b.

Cable assemblies 720a-720b provide electrical power to a palmtop computer, either directly or by use of both a cable assembly and base 700. This allows for quickly charging the connected palmtop computer.

While the present invention has been described in particular embodiments, it should be appreciated that the present invention should not be construed as limited by such embodiments, but rather construed according to the below claims.

What is claimed is:
1. A cable assembly, comprising:
   a docking cradle housing comprising a button, a back surface, an opening extending through said back surface, and a connection mechanism located inside of said docking cradle housing and electrically coupled to said button;
   a first cable comprising a first end and a second end;
   a second cable comprising a first end and a second end;
   a third cable;
   a first connector coupled to said first end of said first cable, wherein said first connector is connected through said opening to said connection mechanism to form an electrical coupling to a first computing device;
   a second connector coupled to said first end of said second cable, wherein said second connector is operable for removably coupling to a second computing device, wherein said first cable and said second cable facilitate data synchronization between said first computing device and said second computing device, wherein said data synchronization is operable to update content of said first computing device with content of said second computing device and vice versa; and
   a power receiving unit coupled to said second end of said first cable and further coupled to said second end of said second cable, and wherein said power receiving unit comprises a housing and a power connector which receives power from a power source, via said third cable coupled to said power connector, for transmission to said first connector independent from power received from said second computing device via said second cable, wherein said second end of said second cable is integrated into said housing of said power receiving unit.

2. The cable assembly as recited in claim 1 wherein said power connector comprises a barrel-style connector receptacle.

3. The cable assembly as recited in claim 1 wherein said second connector is a USB (universal serial bus) connector.

4. The cable assembly as recited in claim 1 wherein said first connector is a wipe-style serial connector.

5. The cable assembly as recited in claim 1 wherein said power source is an AC (alternating current) power source.

6. The cable assembly as recited in claim 1 wherein said power source is a DC (direct current) power source.

7. The cable assembly as recited in claim 1 wherein said third cable is removably coupled to said power connector.

8. The cable assembly as recited in claim 1 wherein said third cable is a power cable.

9. A cable assembly, comprising:
- a docking cradle housing comprising a button, a back surface, an opening extending through said back surface, and a connection mechanism located inside of said docking cradle housing and electrically coupled to said button;
- a first cable comprising a first end and a second end;
- a second cable comprising a first end and a second end;
- a first connector coupled to said first end of said first cable, wherein said first connector is connected through said opening to said connection mechanism to form an electrical coupling to a first computing device;
- a second connector coupled to said first end of said second cable, wherein said second connector is operable for removably coupling to a second computing device, wherein said first cable and said second cable facilitate data synchronization between said first computing device and said second computing device, wherein said data synchronization is operable to update content of said first computing device with content of said second computing device and vice versa; and
- a power receiving unit coupled to said second end of said first cable, and wherein said power receiving unit is further coupled to said second end of said second cable, and wherein said power receiving unit comprises a housing and a power connector which receives power from a power source for transmission to said first connector independent from power received from said second computing device via said second cable, wherein said second end of said second cable is integrated into said housing of said power receiving unit.

10. The cable assembly as recited in claim 9 wherein said power connector comprises a barrel-style connector receptacle.

11. The cable assembly as recited in claim 9 wherein said second connector is a USB (universal serial bus) connector.

12. The cable assembly as recited in claim 9 wherein said first connector is a wipe-style serial connector.

13. The cable assembly as recited in claim 9 wherein said power source is an AC (alternating current) power source.

14. The cable assembly as recited in claim 9 wherein said power source is a DC (direct current) power source.

15. A cable assembly, comprising:
- a docking cradle housing comprising a button, a back surface, an opening extending through said back surface, and a connection mechanism located inside of said docking cradle housing and electrically coupled to said button;
- a first cable comprising a first end and a second end;
- a second cable comprising a first end and a second end;
- a power cable;
- a first connector coupled to said first end of said first cable, wherein said first connector is connected through said opening to said connection mechanism to form an electrical coupling to a first computing device;
- a second connector coupled to said first end of said second cable, wherein said second connector is operable for removably coupling to a second computing device, wherein said first cable and said second cable facilitate data synchronization between said first computing device and said second computing device, wherein said data synchronization is operable to update content of said first computing device with content of said second computing device and vice versa; and
- a power receiving unit coupled to said second end of said first cable, and wherein said power receiving unit is further coupled to said second end of said second cable, and wherein said power receiving unit comprises a housing and a power connector which receives power from a power source, via said power cable coupled to said power connector, for transmission to said first connector independent from power received from said second computing device via said second cable, wherein said second end of said second cable is integrated into said housing of said power receiving unit.

16. The cable assembly as recited in claim 15 wherein said power connector comprises a barrel-style connector receptacle.

17. The cable assembly as recited in claim 15 wherein said second connector is a USB (universal serial bus) connector.

18. The cable assembly as recited in claim 15 wherein said first connector is a wipe-style serial connector.

19. The cable assembly as recited in claim 15 wherein said power source is an AC (alternating current) power source.

20. The cable assembly as recited in claim 15 wherein said power source is a DC (direct current) power source.

* * * * *